(12) United States Patent
Nishihara et al.

(10) Patent No.: US 7,819,559 B2
(45) Date of Patent: Oct. 26, 2010

(54) LIGHT-SOURCE COVER AND PORTABLE DEVICE THEREWITH

(75) Inventors: Tomotaka Nishihara, Hiroshima (JP); Kimiaki Imai, Hiroshima (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 113 days.

(21) Appl. No.: 11/882,716

(22) Filed: Aug. 3, 2007

(65) Prior Publication Data

US 2008/0291657 A1 Nov. 27, 2008

(30) Foreign Application Priority Data

Sep. 15, 2006 (JP) .............................. 2006-251116

(51) Int. Cl.
*F21V 5/02* (2006.01)
(52) U.S. Cl. ............... 362/333; 362/97.1; 362/97.4; 362/109; 396/529
(58) Field of Classification Search ............ 362/235, 362/249, 268, 355, 16, 97.1–97.4, 311.06, 362/327, 329, 333; 396/176, 529
See application file for complete search history.

(56) References Cited

U.S. PATENT DOCUMENTS

| 5,568,324 | A | * | 10/1996 | Nelson et al. ............... 359/742 |
| 5,852,751 | A | | 12/1998 | Kawabata et al. |
| 6,011,929 | A | | 1/2000 | Fuke et al. |
| 6,456,436 | B2 | * | 9/2002 | Miura et al. ............... 359/619 |
| 7,343,714 | B2 | * | 3/2008 | Zocco ...................... 52/204.59 |
| 7,452,093 | B2 | | 11/2008 | Nagao |

FOREIGN PATENT DOCUMENTS

| JP | 61-272728 A | 12/1986 |
| JP | 62-145216 U | 9/1987 |
| JP | 05-341359 A | 12/1993 |
| JP | 8-36179 A | 2/1996 |
| JP | 10-39377 A | 2/1998 |
| JP | 10-68987 A | 3/1998 |
| JP | 2002-72938 A | 3/2002 |
| JP | 2003-140232 A | 5/2003 |
| JP | 2003-161988 A | 6/2003 |
| JP | 2004-48469 A | 2/2004 |
| JP | 2004-138784 A | 5/2004 |
| JP | 2004-205666 A | 7/2004 |
| JP | 2005-17814 A | 1/2005 |
| JP | 2006-91821 A | 4/2006 |
| JP | 2006-202700 A | 8/2006 |
| JP | 2006-203476 A | 8/2006 |
| KR | 20-0353040 Y1 | 6/2004 |
| KR | 10-2005-0093738 A | 9/2005 |

* cited by examiner

*Primary Examiner*—Thomas M Sember
(74) *Attorney, Agent, or Firm*—Birch, Stewart, Kolasch & Birch, LLP

(57) ABSTRACT

A light-source cover for controlling transmission of light from a light source mounted in a portable device is made of an optical material. The front surface of the light-source cover has a knurl finish composed of linear grooves and the back surface thereof has a spin finish composed of ripple grooves. Alternatively, both the front and back surfaces of the light-source cover have knurl finishes composed of linear grooves. Still alternatively, only the back surface of the light-source cover has a knurl finish or a spin finish.

13 Claims, 14 Drawing Sheets

FIG. 7A
FIG. 7B
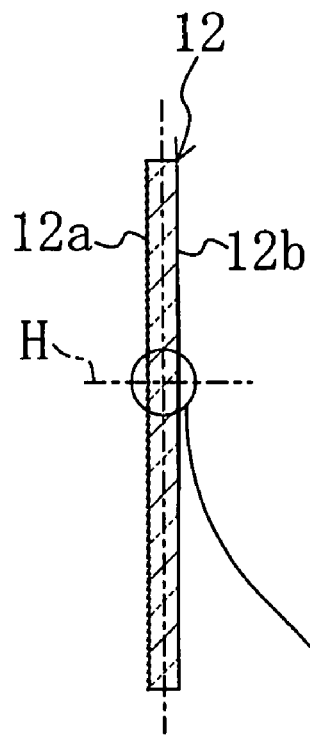
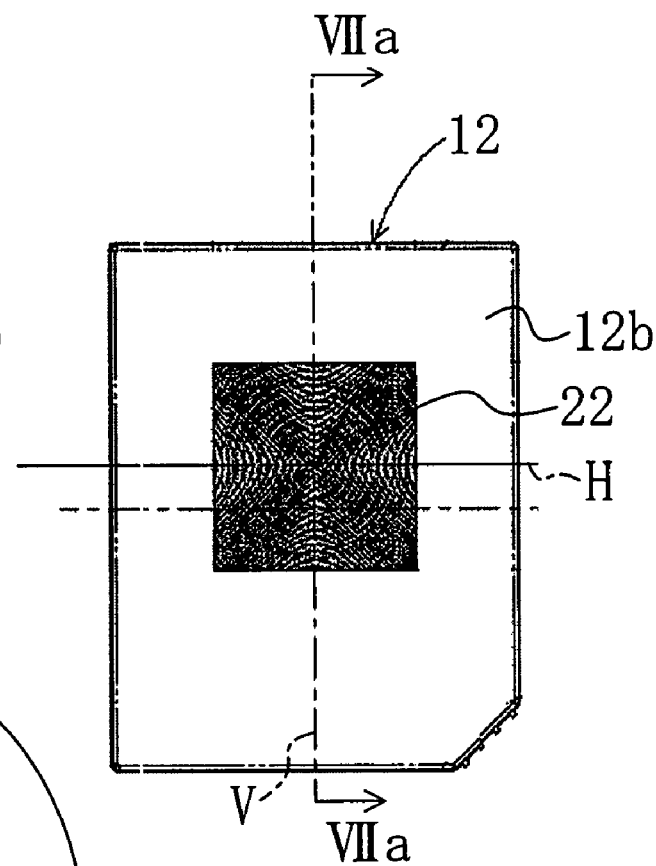
FIG. 7C
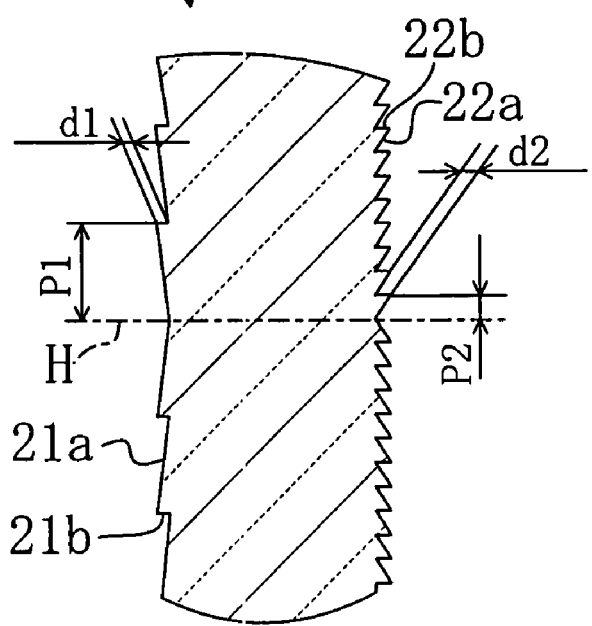

FIG. 10A
FIG. 10B
FIG. 10C
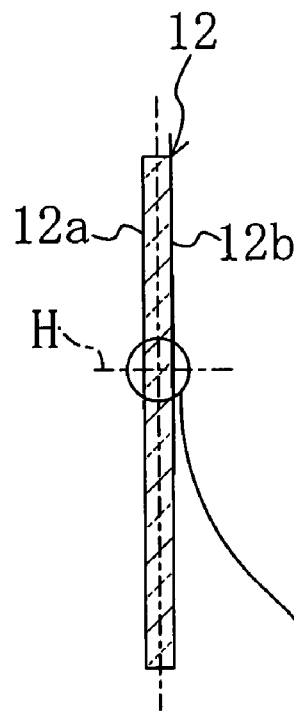
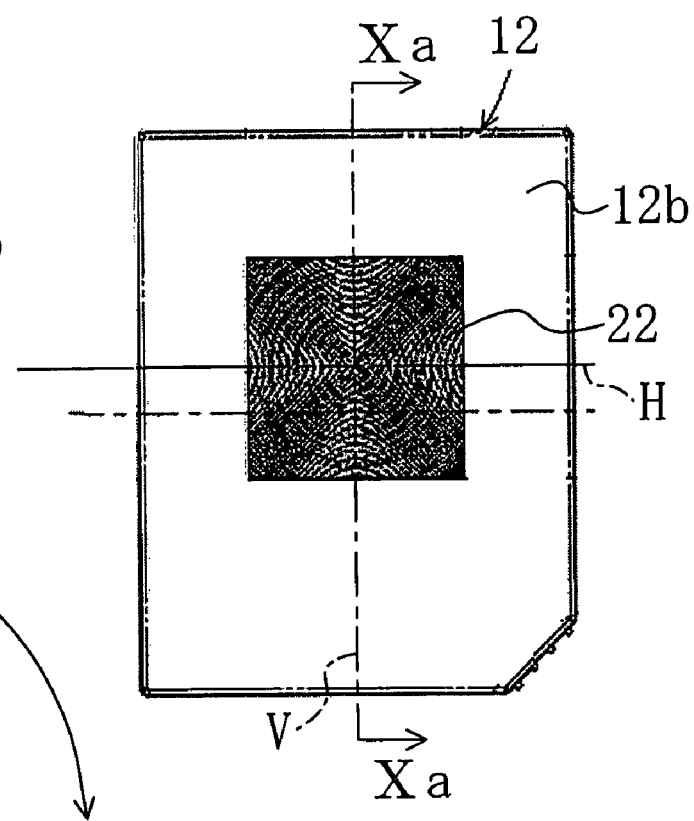
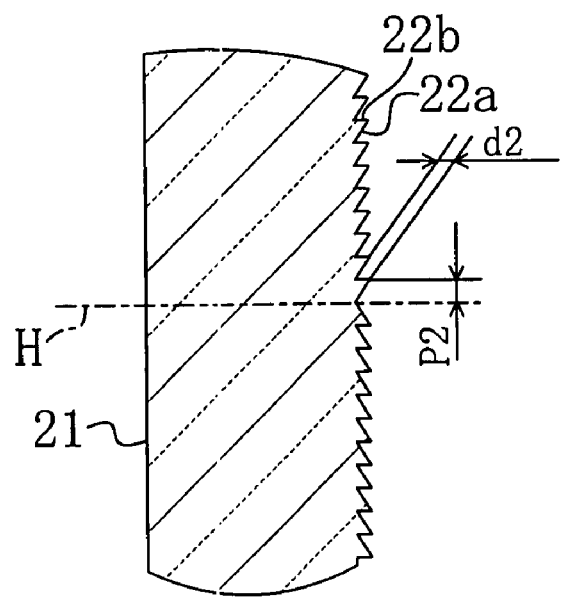

FIG. 11

| | Finish type | Groove depth in the front d1 (μm) | Groove depth in the back d2 (μm) | Illuminance distribution | On-axis illuminance |
|---|---|---|---|---|---|
| Case 1 | Front: flat<br>Back: flat | 0 | 0 | | 100 |

| | Finish type | Groove depth in the front d1 (μm) | Groove depth in the back d2 (μm) | Illuminance distribution | Relative illuminance |
|---|---|---|---|---|---|
| Case 2 | Front: flat<br>Back: knurl | 0 | 50 | | 47 |
| Case 3 | Front: flat<br>Back: knurl | 0 | 20 | | 83 |
| Case 4 | Front: knurl<br>Back: knurl (grid pattern) | 50 | 50 | | 56 |

FIG. 13
P1 = 100 μm
P2 = 100 μm
| | Finish type | Groove depth in the front d1 (μm) | Groove depth in the back d2 (μm) | Illuminance distribution | Relative illuminance |
|---|---|---|---|---|---|
| Case 5 | Front: knurl<br>Back: knurl (grid pattern) | 80 | 80 | 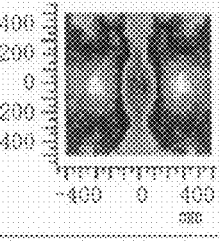 | 4 |
| Case 6 | Front: knurl<br>Back: knurl (grid pattern) | 110 | 110 | 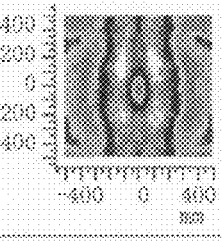 | 8 |
| Case 7 | Front: knurl<br>Back: knurl (grid pattern) | 140 | 140 | 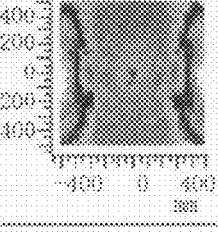 | 5 |

| | Finish type | Groove depth in the front d1 (μm) | Groove depth in the back d2 (μm) | Illuminance distribution | Relative illuminance |
|---|---|---|---|---|---|
| Case 8 | Front: knurl<br>Back: knurl (grid pattern) | 80 | 20 | | 47 |
| Case 9 | Front: knurl<br>Back: knurl (grid pattern) | 110 | 20 | | 33 |
| Case 10 | Front: knurl<br>Back: knurl (grid pattern) | 140 | 20 | | 21 |

FIG. 15
$d1 = 50 \mu m$
$d2 = 50 \mu m$
| | Finish type | Groove pitch in the front P1 ($\mu m$) | Groove pitch in the back P2 ($\mu m$) | Illuminance distribution | Relative illuminance |
|---|---|---|---|---|---|
| Case 11 | Front: knurl<br>Back: knurl (grid pattern) | 400 | 100 | 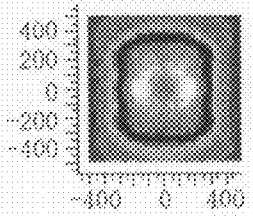 | 76 |
| Case 12 | Front: knurl<br>Back: knurl (grid pattern) | 200 | 100 | 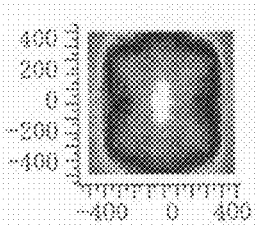 | 94 |

FIG. 16
$d1 = 50 \mu m$
$d2 = 50 \mu m$
| | Finish type | Groove pitch in the front P1 ($\mu m$) | Groove pitch in the back P2 ($\mu m$) | Illuminance distribution | Relative illuminance |
|---|---|---|---|---|---|
| Case 13 | Front: knurl Back: spin | 400 | 200 | 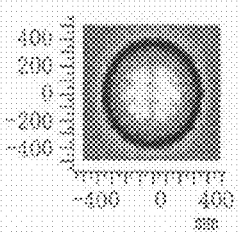 | 66 |
| Case 14 | Front: knurl Back: spin | 200 | 100 | 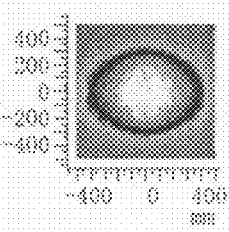 | 68 |
| Case 15 | Front: knurl Back: spin | 200 | 200 | 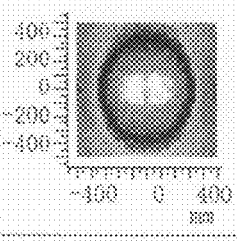 | 62 |
| Case 16 | Front: knurl Back: spin | 400 | 100 | 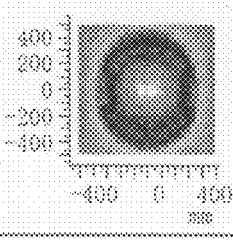 | 55 |

LIGHT-SOURCE COVER AND PORTABLE DEVICE THEREWITH

CROSS-REFERENCE TO RELATED APPLICATION

This application claims priority under 35 USC 119 to Japanese Patent Application No. 2006-251116 filed on Sep. 15, 2006, the entire contents of which are incorporated herein by reference.

BACKGROUND OF THE INVENTION (a) Field of the Invention

This invention relates to a light-source cover for controlling transmission of light from a light source mounted in a portable device and a portable device with the same.

(b) Description of the Related Art

Photography in dark places uses at flash. It is desirable in such a case that the photo is taken, without adverse effects from the flash, with naturalness as if taken in the daylight. Therefore, a light-source cover is placed in front of the light source to diffuse light.

Mobile phones employ a simple light source, such as an LED, owing to size constraint. In taking a photo in the dark, the light source is switched on to provide a clear picture image. The light source is used also as a spot light for shining on the user's hand in the dark. Furthermore, when a call or a mail is incoming, the light source blinks to let the user know it. The light source is covered with a light-source cover on which an opalescent medium print is made to reduce light transmission and into which a light diffusion agent is mixed to provide a light diffusion effect and a blinder effect.

Cameras, such as a single-lens reflex camera, generally use an electronic flash in taking photos in the darkness. For example, Published Japanese Patent Application No. H10-39377 discloses an electronic flash in which a light controller placed in front of an umbrella reflector is composed of a diffusion control part having a light diffusion effect on light from a stroboscopic tube only in the longitudinal direction of the tube and a collection control part having a light collection effect of collecting incident light to all the directions. Thus, the light controller can diffuse incident light from the stroboscopic tube in the longitudinal direction of the stroboscopic tube at the diffusion control part. This provides a variable irradiation angle electronic flash limiting the prism effect of the light controller.

Published Japanese Patent Application No. H10-68987 discloses an optical material placed in front of a bar-like light source and composed of first and second collection lenses located on the right and left sides, respectively, of a reference line orthogonal to the longitudinal direction of the bar-like light source. The first and second collection lenses have an optical property of hardly diffusing light from the light source in the direction of the reference line but largely diffusing the light in the longitudinal direction of the light source. This provides an optical material and an electronic flash with the same which largely diffuse light from the light source particularly in the longitudinal direction of the light source and thereby enable setting of a light distribution characteristic of having a wide light irradiation angle.

Published Japanese Patent Application No. 2004-138784 discloses an electronic flash in which a light controller placed in front of a bar-like light source includes a diffusion control part formed in one surface of the light controller and collection control parts formed at lateral ends of the light controller not corresponding to the aperture of an umbrella reflector in wide angle mode. The diffusion control part has a light diffusion effect on light from the bar-like light source only in the longitudinal direction of the bar-like light source. One of the collection control parts has a light collection effect on light from the bar-like light source only in the longitudinal direction of the bar-like light source. The other collection control part has a light collection effect on light from the bar-like light source only in the direction orthogonal to the longitudinal direction of the bar-like light source.

The conventional light-source cover having a medium print, however, considerably reduces the illuminance and, therefore, the light source often does not act well as a fill light for photography. In other words, if greater importance is given to the appearance, the illuminance becomes poor.

For mobile phones, the locations of their light-source covers and light sources are limited. Therefore, mobile phones have constraints, such as the impossibility of stacking two light-source covers and the impossibility of using a light source capable of emitting a powerful flash, unlike conventional electronic flashes.

SUMMARY OF THE INVENTION

The present invention has been made in view of the foregoing points and, therefore, its object is to evenly diffuse light from a light source with a simple structure and obscure the light source not in use from external view to keep the attractive appearance.

To attain the above object, in the present invention, at least one surface of a light-source cover made of an optical material is knurled or spin finished.

Specifically, a first aspect of the present invention is directed to a light source mounted in a portable device, wherein the light-source cover is made of an optical material and has a flat front surface or a front surface with a knurl finish composed of linear grooves and a back surface with a knurl finish composed of linear grooves or a spin finish composed of ripple grooves.

With this configuration, the knurl finish on the front surface, the knurl finish on the back surface or the spin finish on the back surface makes it difficult for the light source not in use to be seen from the outside. Thus, the appearance can be improved and concurrently light from the light source can be appropriately diffused.

In a second aspect of the invention, the optical material is a molded article made of acrylic resin or polycarbonate resin.

With this configuration, these optical materials called organic glass have high transparencies and, therefore, are suitable as materials for a cover for covering the light source. Furthermore, these materials are easy to mold and easy to knurl and spin finish. Particularly, ester methacrylate polymer is one of acrylic resins having the highest transparency, has a high refractive index and can be injection molded into complex shapes by thermoplasticization, which are reasons why it is commonly used as a material for an optical component. Polycarbonate resin is very excellent in impact resistance.

In a third aspect of the invention, each of the knurl finish and the spin finish has a depth of 50±10 µm.

If the depth of the finish is too small, the light source not in use is likely to be seen through the light-source cover, thereby impairing the appearance. If the depth of the finish is too large, the amount of light shielded becomes too large, which prevents the light source from serving as a fill light for photography. In contrast, with the above configuration, light from the light source can be appropriately diffused while the light source not in use can be prevented from being seen through the light-source cover.

In a fourth aspect of the invention, the knurl finish on the front surface has a pitch of 400±100 μm and the knurl finish or the spin finish on the back surface has a pitch of 100±25 μm.

If the pitch of the knurl finish or the pitch of the spin finish is too large, the light source not in use is likely to be seen through the light-source cover, thereby impairing the appearance. If the pitch of the knurl finish or the pitch of the spin finish is too small, light from the light source cannot be well diffused and, therefore, cannot serve as a fill light for photography. In contrast, with the above configuration, light from the light source can be appropriately diffused while the light source not in use can be prevented from being seen through the light-source cover.

In a fifth aspect of the invention, each of the knurl finish and the spin finish has a saw-toothed cross section and each saw tooth of the saw-toothed cross section includes an inclined part extending outwardly from the side close to the central axis of the light source to gradually increase the tooth height and an orthogonal part continued from the inclined part to fall therefrom orthogonally to the finished surface.

With this configuration, light from the light source can be appropriately diffused.

In a sixth aspect of the invention, the inclined part of the knurl finish on the front surface has a gradient of substantially tan ⅛ and the inclined part of the knurl finish or the spin finish on the back surface has a gradient of substantially tan ½.

With this configuration, light from the light source can be easily appropriately diffused.

In a seventh aspect of the invention, each of the knurl finish on the front surface, the knurl finish on the back surface and the spin finish on the back surface is applied to form a depression towards the central axis of the light source.

This provides a uniform light diffusion.

In an eighth aspect of the invention, the knurl finishes on the front surface and the back surface are applied to be orthogonal to each other as viewed from the front surface.

This further effectively prevents the light source not in use from being seen through the light-source cover.

A ninth aspect of the invention is directed to a portable device including the light-source cover according to any one of the above aspects of the invention.

In this case, since the light-source cover has a simple structure, the portable device need not be increased in its total size. This provides a portable device having a high portability, ease of taking photos even in the dark because of appropriate diffusion of light from the light source and a good appearance.

In a tenth aspect of the invention, the portable device comprises a mobile phone.

In this case, even when a simple light source, such as an LED, is employed owing to size constraint, light from the light source can be appropriately diffused in taking photos in the dark, thereby obtaining clear picture images. Furthermore, the light source not in use is less likely to be seen through the light-source cover, which provides a mobile phone of high sense of fashion.

BRIEF DESCRIPTION OF THE DRAWINGS

FIG. 7A is a cross-sectional view of the light-source cover taken along the line VIIa-VIIa of FIG. 7B; FIG. 7B is a back view of the light-source cover; and FIG. 7C is a partly enlarged view of FIG. 7A.

FIG. 10A to 10C shows corresponding views of FIG. 7A to 7C, showing a light-source cover according to a fourth embodiment of the present invention.

FIG. 11 is a table showing Illuminance Test Case 1.
FIG. 12 is a table showing Illuminance Test Cases 2 to 4.
FIG. 13 is a table showing Illuminance Test Cases 5 to 7.
FIG. 14 is a table showing Illuminance Test Cases 8 to 10.
FIG. 15 is a table showing Illuminance Test Cases 11 and 12.
FIG. 16 is a table showing Illuminance Test Cases 13 to 16.

DETAILED DESCRIPTION OF THE INVENTION

Hereinafter, embodiments of the present invention will be described with reference to the drawings.

Embodiment 1

Figure 1:
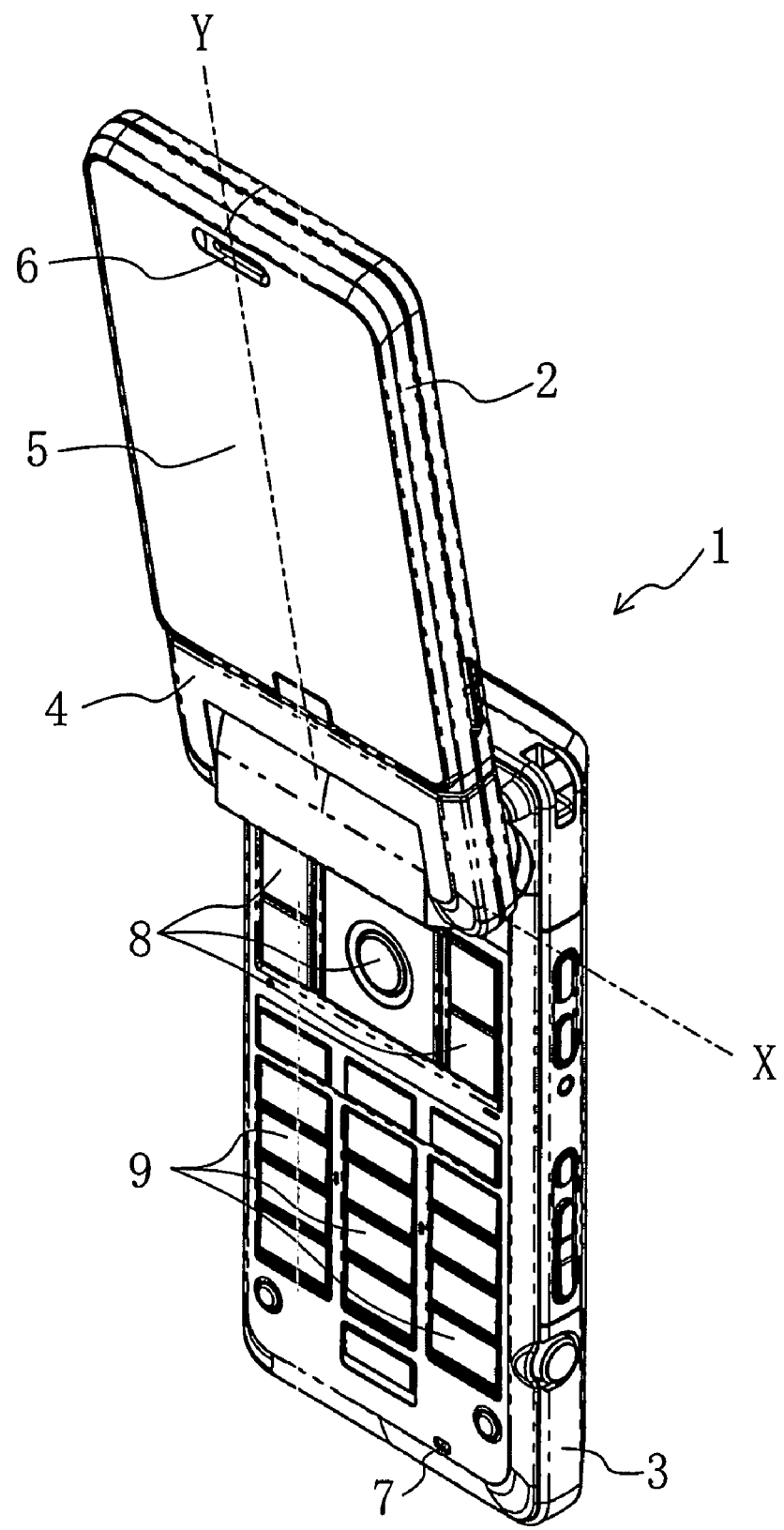
FIG. 1 is a perspective view of a mobile phone according to an embodiment of the present invention, showing its opened state as viewed from the front surfaces.
Figure 2:
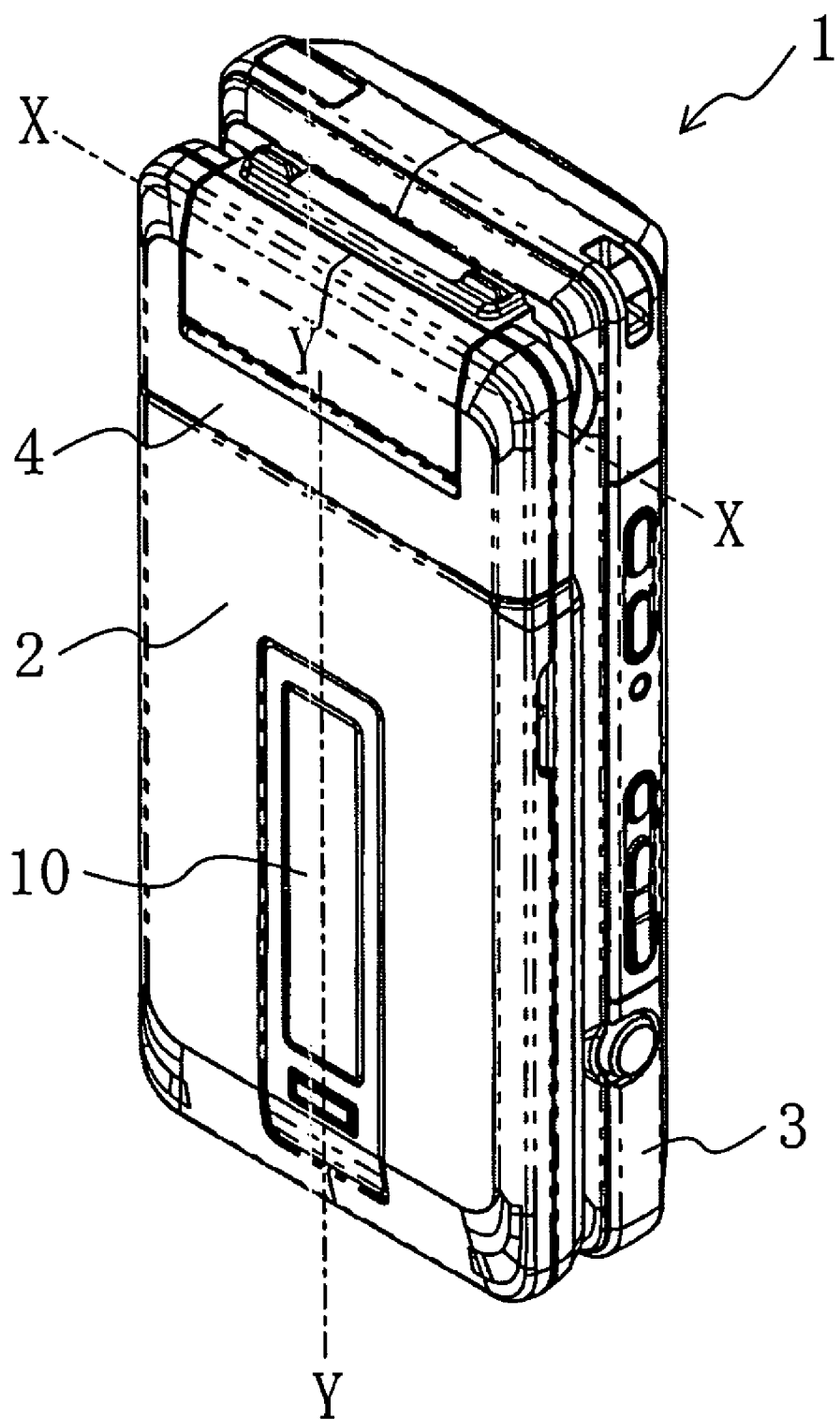
FIG. 2 is a perspective view of the mobile phone, showing its closed state as viewed from the front surface of a first housing.
Figure 3:
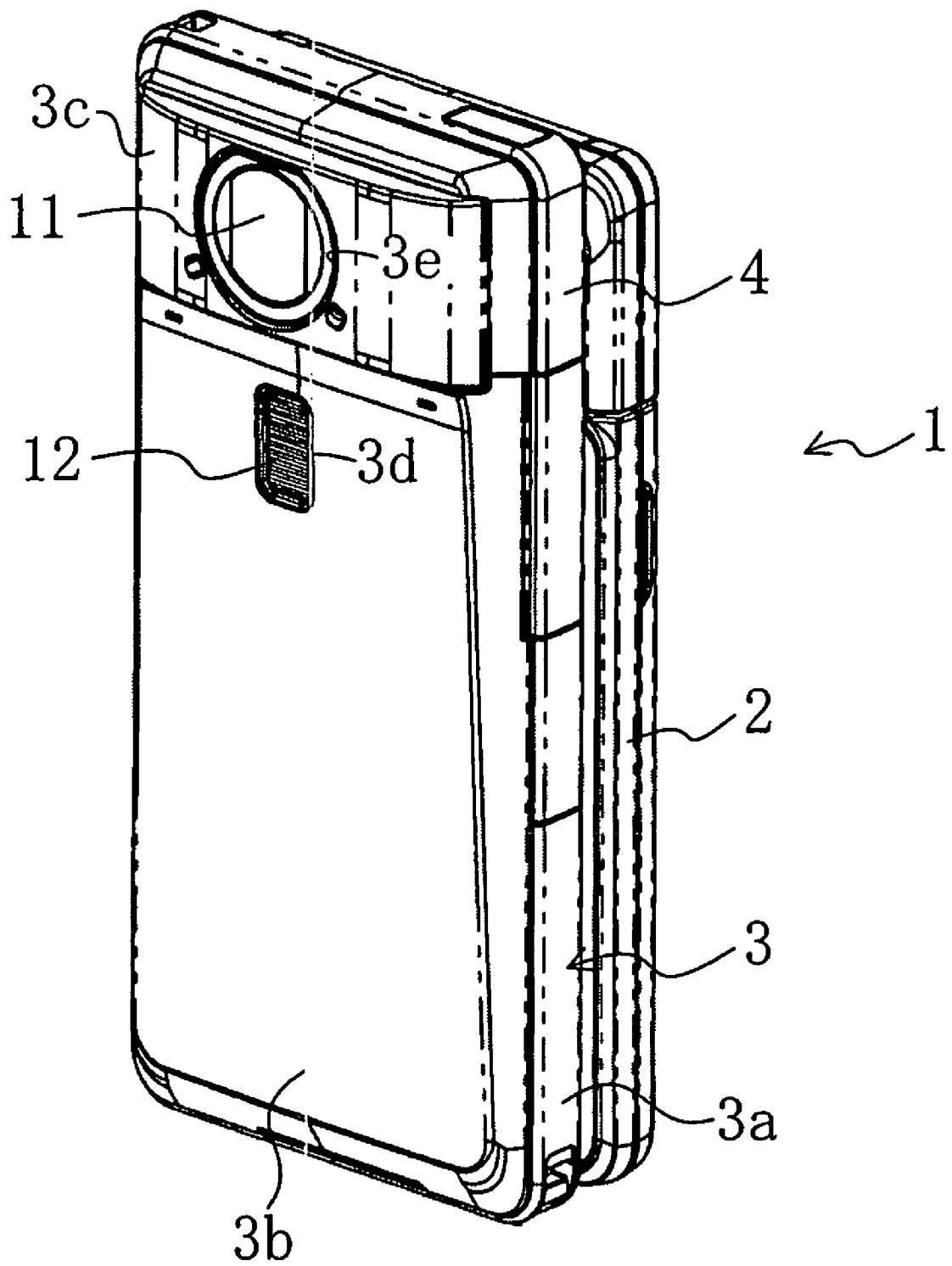
FIG. 3 is a perspective view of the mobile phone, showing its closed state as viewed from the back surface of a second housing.

FIGS. 1 to 3 show a mobile phone 1 as a portable device according to a first embodiment of the present invention. The mobile phone 1 includes a first housing 2 and a second housing 3 which are connected tog)ether by a hinge 4 to allow the first and second housings 2 and 3 to be folded together about an axis X. The first housing 2 is pivotable 180 degrees about an axis Y with respect to the hinge 4. Therefore, when the first housing 2 is pivoted 180 degrees and then folded on the second housing 3, its first display 5 appears on the exterior of the mobile phone 1.

The first housing 2 includes the first display 5 and a receiver 6 both on the front surface and a second display 10 on the back surface. When the mobile phone 1 is on standby, the second display 10 normally displays the date or time. When the mobile phone 1 receives a mail or a telephone call, the second display 10 displays the name or telephone number at the other end of the line to let the user know who is mailing or calling him or her.

The second housing 3 includes t microphone 7, function buttons 8 and input buttons 9 on the front surface. The back surface of the second housing 3 is covered with a back cabinet 3*a*. The back cabinet 3*a* is further covered with a lower cover 3*b* and an upper cover 3*c*. The lower cover 3*b* has a light-source window 3*d* formed therein. The upper cover 3*c* has a camera window 3*e* formed therein. A camera 11 is directed through the camera window 3*e* to the outside.

The light-source cover 12 covers a light source 13 (see FIG. 5) placed thereunder in the second housing 3. The light source 13 is constituted, for example, by an LED. When photos are taken by the camera 11 in the dark, the light source 13 is switched on and used to provide clear camera picture images. The light source 13 is also used as a spot light for shining on the user's hand in the dark. Furthermore, when a call or a mail is incoming, the light source 13 blinks to let the user know it.

Figure 6A:
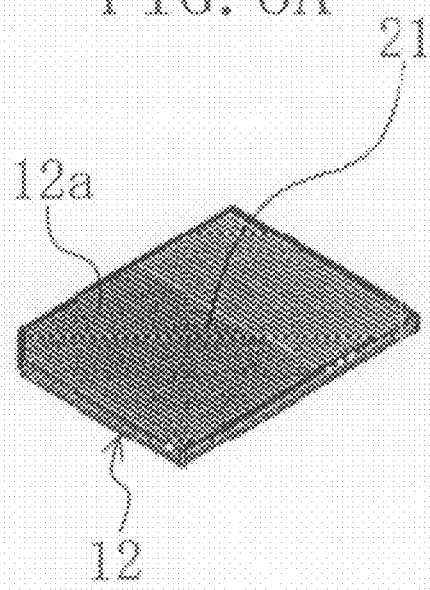
FIG. 6A is a perspective view of the light-source cover as viewed from the front surface.
Figure 6B:
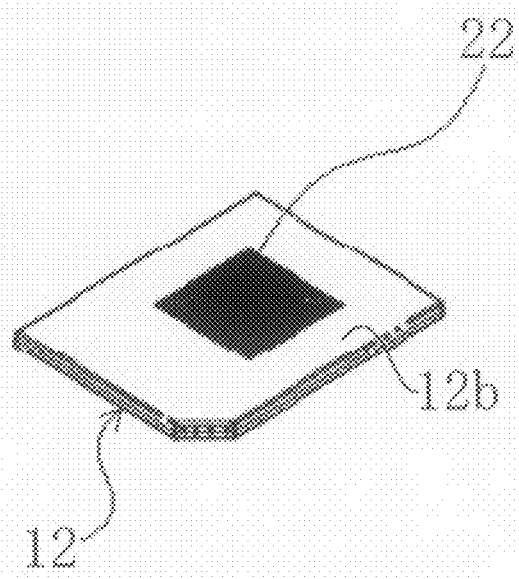
FIG. 6B is a perspective view of the light-source cover as viewed from the back surface.

FIG. 6 shows perspective views of the light-source cover 12. The light-source cover 12 is composed of a molded article made of acrylic resin or polycarbonate resin, which are optical materials, and is attached to the inside of the back cabinet 3a of the second housing 3. These optical materials are called organic glass and are suitable as materials for the cover covering the light source because of their high transparency. Furthermore, these materials are easy to mold and easy to knurl and spin finish. Particularly, ester methacrylate polymer is one of acrylic resins having the highest transparency, has a high refractive index and can be injection molded into complex shapes by thermoplasticization, which are reasons why it is commonly used as a material for an optical component. Polycarbonate resin is very excellent in impact resistance.

Figure 4:
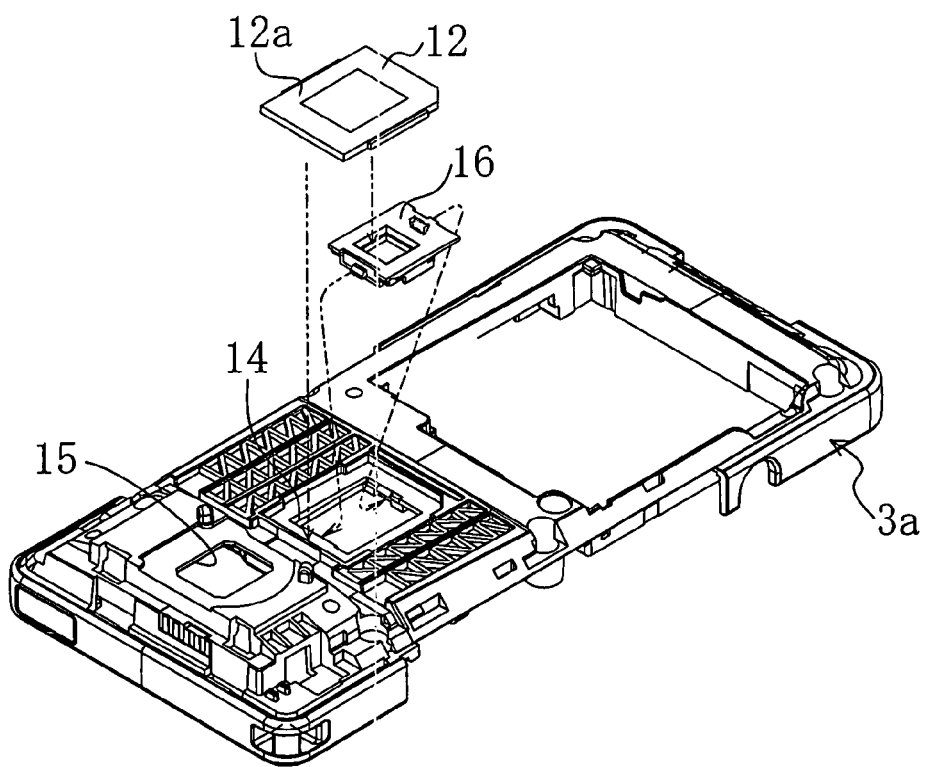
FIG. 4 is an exploded perspective view of the mobile phone, showing a back cabinet and a light-source cover.
Figure 5:
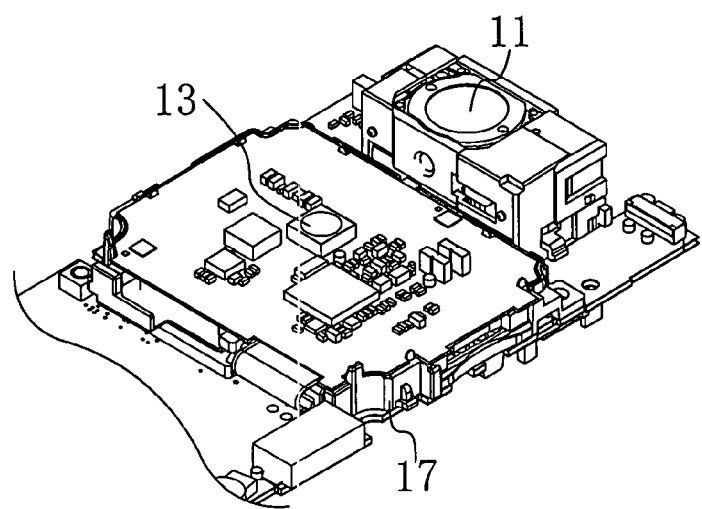
FIG. 5 is a perspective view of a circuit board as viewed from the top side.

As shown in FIGS. 4 and 5, the back cabinet 3a is formed with a light-source insertion hole 14 in which the light source 13 is inserted and a camera insertion hole 15 through which the camera 11 can see objects. The light-source insertion hole 14 is formed to fit on a light-source holder 16. The light-source cover 12 is fitted to the front side of the light-source holder 16. This fitting is made by aligning the center of the light-source cover 12 with the center of the light source 13.

On the other hand, the front side (input button 9 side) of the back cabinet 3a is configured to receive a circuit board 17. The circuit board 17 has the light source 13 and the camera 11 fitted thereto.

The components in the back cabinet 3a are assembled, by fitting into the back cabinet 3a the circuit board 17 on which the light source 13 and the camera 11 are mounted, so that the camera 11 is directed to the outside through the camera insertion hole 15 and the light source 13 is directed to the outside through the light-source holder 16 and the light-source cover 12.

As shown in FIGS. 6 and 7, the front surface 12a of the light-source cover 12 is entirely formed with a knurl finish 21 composed of linear grooves. The linear grooves extend in the lateral direction of the mobile phone 1. The back surface 12b of the light-source cover 12 is formed with a spin finish 22 composed of ripple grooves and having an area slightly wider than that of the light-source window 3d. These finishes on the front and back surfaces 12a and 12b of the light-source cover 12 are applied during molding by a mold having grooves shaped by a machine, such as an NC machine. These finishes on the front and back surfaces 12a and 12b of the light-source cover 12 provide ideal light control over the light source 13.

The knurl finish 21 on the front surface 12a has a depth d1 of 50 μm, a pitch p1 of 400 μm and a saw-toothed cross section. Specifically, each saw tooth of the saw-toothed cross section includes an inclined part 21a increasing its tooth height as it goes away from the center line H extending laterally and orthogonally to the central axis of the light source 13, and an orthogonal part 21b continued from the inclined part 21a to fall therefrom orthogonally to the finished surface. The inclined part 21a has a gradient of substantially tan ⅛. The saw teeth are vertically symmetrically arranged as viewed in FIG. 7C and appear to laterally linearly extend as viewed from the front surface 12a. Furthermore, the knurl finish 21 is applied to form as a whole a depression towards the central axis of the light source 13. However, the knurl finish 21 may be applied to vertically linearly extend.

The spin finish 22 on the back surface 12b has a depth d2 of 50 μm, a pitch p2 of 100 μm and a saw-toothed cross section. Specifically, each saw tooth of the saw-toothed cross section includes an inclined part 22a extending outwardly like a wave from the side close to the central axis of the light source 13 to gradually increase its tooth height, and an orthogonal part 22b continued from the inclined part 22a to fall therefrom orthogonally to the finished surface. The inclined part 22a has a gradient of substantially tan ½. The spin finish 22 is applied to form as a whole a depression towards the central axis of the light source 13.

With this configuration, when switched off, the light source 13 is hard to see and only the light-source cover 12 can be seen owing to reflection of external light. When switched on, coupled with the light diffusion effect, the light source 13 can be prevented from reducing its illuminance.

For example, if the mobile phone 1 includes a light source 13 equivalent to those for digital cameras, it can take photos in the dark which would not be provided by the conventional mobile phones.

Effects of Embodiment 1

According to the light-source cover 12 of this embodiment, since the light-source cover 12 made of an optical material is formed with a knurl finish 21 and a spin finish 22, light from the light source 13 can be evenly diffused with a simple structure and the light source 13 not in use can be obscured from external view to keep the attractive appearance.

Furthermore, since the light-source cover 12 has a simple structure, this avoids the increase in the total size of the mobile phone 1. Therefore, a mobile phone 1 can be obtained which has a high portability, provides ease of taking photos even in the dark because of appropriate diffusion of light from the light source 13 and has a good appearance.

Furthermore, even when a simple light source, such as an LED, is employed owing to size constraint, light from the light source 13 can be appropriately diffused in taking photos in the dark, thereby providing clear picture images. Furthermore, the light source 13 not in use is less likely to be seen through the light-source cover 12, which provides a mobile phone 1 of high sense of fashion.

Embodiment 2

Figure 8A:
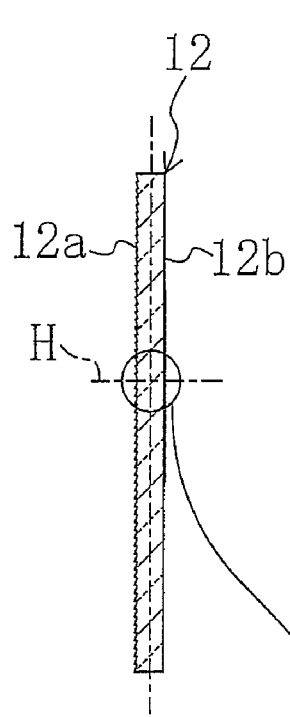
FIG. 8A to 8C shows corresponding views of FIG. 7A to 7C, showing a light-source cover according to a second embodiment of the present invention.
Figure 8B:
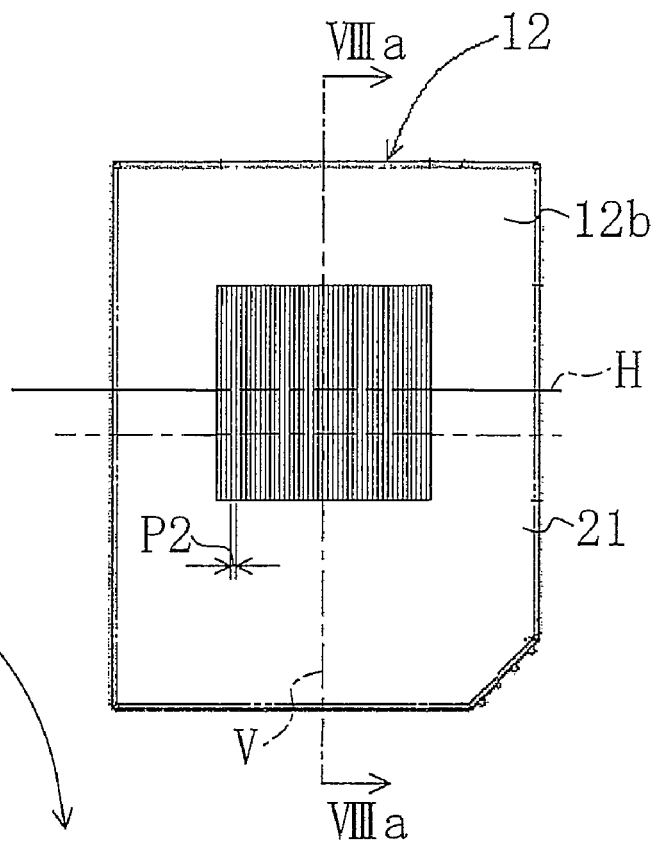
Figure 8C:
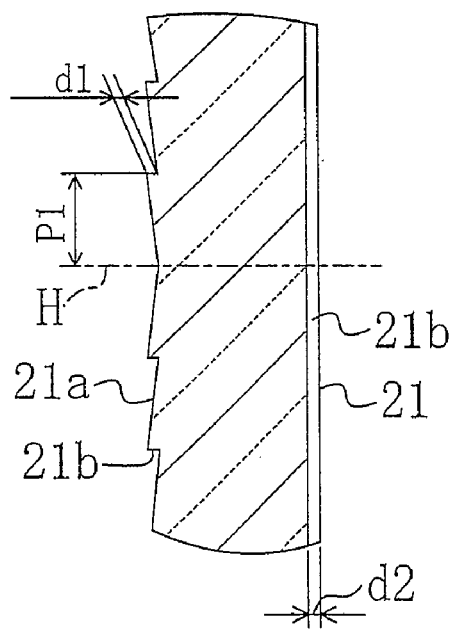

FIG. 8 shows a light-source cover 12 of a mobile phone 1 according to a second embodiment of the present invention. This embodiment is different from the first embodiment in the type of finish on the back surface 12b of the light-source cover 12. Note that in the following embodiments the same parts as shown in FIGS. 1 to 6 are identified by the same reference numerals and their detailed description is not given.

In this embodiment, the front surface 12a of the light-source cover 12 is entirely formed with a knurled finish 21 composed of laterally extending grooves and the back surface 12b thereof is formed with a knurl finish 21 composed of vertically extending grooves and having an area slightly wider than that of the light-source window 3d.

The knurl finish 21 on the front surface 12a has a depth d1 of 50 μm, a pitch p1 of 400 μm and a saw-toothed cross section. Specifically, each saw tooth of the saw-toothed cross section includes an inclined part 21a increasing its tooth height as it goes away from the center line H extending laterally and orthogonally to the central axis of the light source 13, and an orthogonal part 21b continued from the inclined part 21a to fall therefrom orthogonally to the finished surface. The inclined part 21a has a gradient of substantially tan ⅛. The saw teeth are vertically symmetrically arranged as viewed in FIG. 8C and appear to laterally linearly extend as viewed from the front surface 12a. Furthermore, the knurl finish 21 is applied to form as a whole a depression towards the central axis of the light source 13.

The knurl finish 21 on the back surface 12b has a depth d2 of 50 μm, a pitch p2 of 100 μm and a saw-toothed cross section. Specifically, each saw tooth of the saw-toothed cross section includes an inclined part 21a increasing its tooth height as it goes away from the center line V extending vertically and orthogonally to the central axis of the light source 13, and an orthogonal part 21b continued from the inclined part (not shown) of the knurl finish 21 on the back surface 12b to fall therefrom orthogonally to the finished surface. The inclined part has a gradient of substantially tan ½. The saw teeth are laterally symmetrically arranged and appear to vertically linearly extend as viewed from the front surface 12a. Furthermore, the knurl finish 21 is applied to form as a whole a depression towards the central axis of the light source 13.

The knurl finishes 21 on the front and back surfaces 12a and 12b are arranged orthogonally to each other (to form a grid) as viewed from the front surface 12a. This makes it difficult for the light source 13 not in use to be seen through the light-source cover 12. The arrangement of the knurl finishes 21 need not necessarily be orthogonal to each other as viewed from the front surface 12a and the knurl finishes 21 may be arranged to intersect with each other at a smaller angle than 90°.

Effects of Embodiment 2

Therefore, according to the light-source cover 12 of this embodiment, since the front and back surfaces 12a and 12b of the light-source cover 12 made of an optical material are formed with knurl finishes 21, light from the light source 13 can be evenly diffused with a simple structure and the light source 13 not in use can be obscured from external view to keep the attractive appearance.

Embodiment 3

Figure 9A:
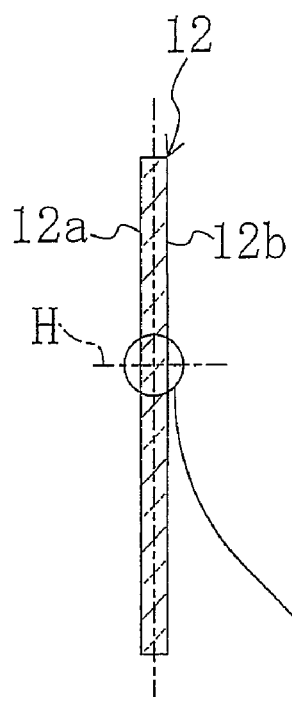
FIG. 9A to 9C shows corresponding views of FIG. 7A to 7C, showing a light-source cover according to a third embodiment of the present invention.
Figure 9B:
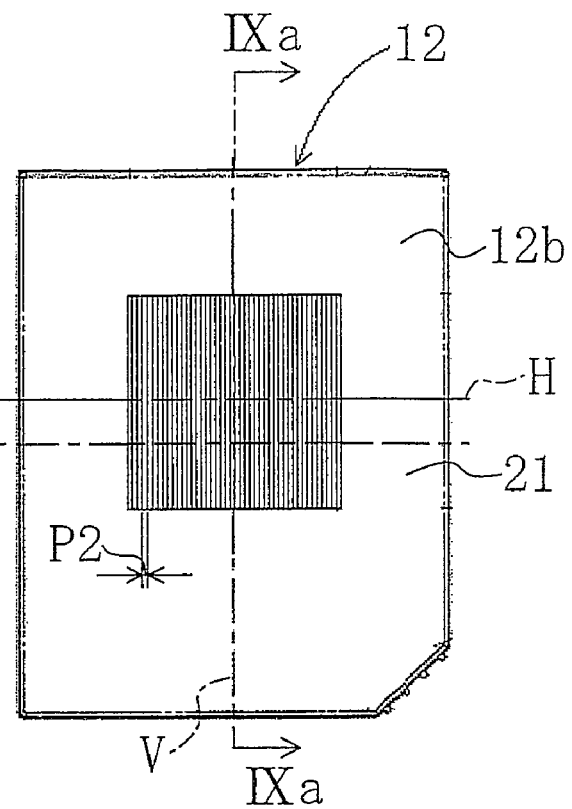
Figure 9C:
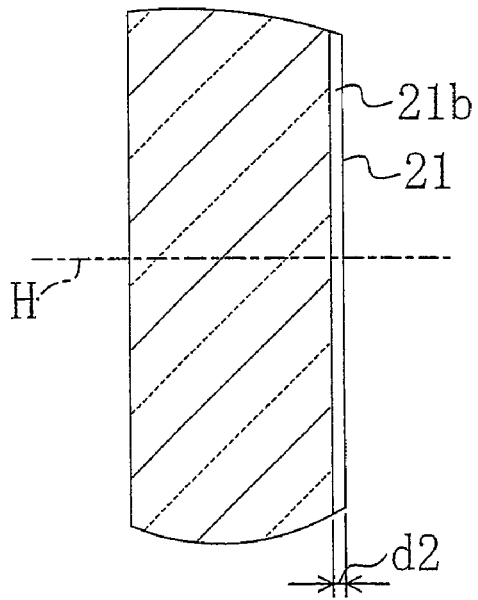

FIG. 9 shows a light-source cover 12 of a mobile phone 1 according to a third embodiment of the present invention. This embodiment is different from the first embodiment in the type of finish on the front surface 12a and back surface 12b of the light-source cover 12. In this embodiment, the front surface 12a of the light-source cover 12 is not formed with any finish, i.e., is flat, while the back surface 12b thereof is formed with a knurl finish 21 having an area slightly wider than that of the light-source window 3d.

The knurl finish 21 on the back surface 12b has a depth d2 of 50 μm, a pitch p2 of 100 μm and a saw-toothed cross section. Specifically, each saw tooth of the saw-toothed cross section includes an inclined part 21a increasing its tooth height as it goes away from the center line V extending vertically and orthogonally to the central axis of the light source 13, and an orthogonal part 21b continued from the inclined part (not shown) of the knurl finish on the back surface 12b to fall therefrom orthogonally to the finished surface. The inclined part has a gradient of substantially tan ½. The saw teeth are laterally symmetrically arranged and appear to vertically linearly extend as viewed from the front surface 12a. Furthermore, the knurl finish 21 is applied to form as a whole a depression towards the central axis of the light source 13. However, the saw teeth of the knurl finish 21 may be vertically symmetrically arranged to laterally linearly extend as viewed from the front surface 12a.

Effects of Embodiment 3

Therefore, according to the light-source cover 12 of this embodiment, since the back surface 12b of the light-source cover 12 made of an optical material is formed with a knurl finish 21, light from the light source 13 can be evenly diffused with a simple structure and the light source 13 not in use can be obscured from external view to keep the attractive appearance.

Embodiment 4

FIG. 10 shows a light-source cover 12 of a mobile phone 1 according to a fourth embodiment of the present invention. This embodiment is different from the first embodiment in the configuration of the front surface 12a of the light-source cover 12. In this embodiment, the front surface 12a of the light-source cover 12 is not formed with any finish, i.e., is flat, while the back surface 12b thereof is formed with a spin finish 22 having an area slightly wider than that of the light-source window 3d.

The spin finish 22 on the back surface 12b has a depth d2 of 50 μm, a pitch p2 of 100 μm and a saw-toothed cross section. Specifically, each saw tooth of the saw-toothed cross section includes an inclined part 22a extending outwardly like a wave from the side close to the central axis of the light source 13 to gradually increase its tooth height, and an orthogonal part 22b continued from the inclined part 22a to fall therefrom orthogonally to the finished surface. The inclined part 22a has a gradient of substantially tan ½. The spin finish 22 is applied to form as a whole a depression towards the central axis of the light source 13.

Effects of Embodiment 4

Therefore, according to the light-source cover 12 of this embodiment, since the back surface 12b of the light-source cover 12 made of an optical material is formed with a spin finish 22, light from the light source 13 can be evenly diffused with a simple structure and the light source 13 not in use can be obscured from external view to keep the attractive appearance.

Illuminance Test Results

The optimum finishes on the front and back surfaces 12a and 12b of the light-source cover 12 in the above embodiments were determined based on the results of the following various illuminance test cases for the light-source covers 12. A description is given of the illuminance test.

The illuminance test was made under conditions that the type of finish on the front and back surfaces 12a and 12b, including "not finished" (indicated as "flat" in Tables), a knurl finish 21 and a spin finish 22, the depths d1 and d2 of the knurl finish 21 and spin finish 22 and the pitches p1 and p2 of them were changed and the finishes had saw-toothed cross sections like the above embodiment.

Case 1 is the illuminance test case where both the front and back surfaces 12a and 12b are flat, which is most likely to allow light to transmit the light-source cover 12. The optimum finishes in the above embodiments were determined by measuring the illuminance distribution and the relative illuminance with respect to an illuminance measured in Case 1 and assigned a value of 100 and evaluating the appearance based on the invisibility of the light source 13.

For illuminance distribution, radially diffused one is the best while centrally concentrated one and only vertically diffused one are no good.

FIG. 11 shows the illuminance distribution in Case 1 in which the front and back surfaces 12a and 12b were flat. The illuminance in Case 1 was assigned a value of 100. In this case, no light refraction is exhibited and the light source 13 can be seen through the light-source cover 12, which provides a poor appearance.

FIG. 12 shows the results of other illumination test cases where only the back surface 12b or both the front and back surfaces 12a and 12b were subjected to knurling. In Case 2 (corresponding to the third embodiment) and Case 3, like the third embodiment, the front surface 12a was flat and the back surface 12b was formed with a vertically extending knurl finish 21. In Case 4, like the second embodiment, the front and back surfaces 12a and 12b were formed with knurl finishes to form a grid as viewed from the front surface 12a. The depth d2 of the knurl finish 21 in Case 2 was 50 μm, the depth d2 of the knurl finish 21 in Case 3 was 20 μm and the depths d1 and d2 of the knurl finishes 21 in Case 4 were both 50 μm. The pitches p1 and p2 of the knurl finishes 21 on the front and back surfaces 12a and 12b in these cases were the same, 100 μm. The test results show that when the depths d1 and d2 of the knurl finishes 21 were 50 μm, the illuminance reduced by approximately half of the reference illuminance. Furthermore, when the depth d2 of the knurl finish 21 was 20 μm, the relative illuminance was 83%.

FIG. 13 shows the results of still other illumination test cases where the front surface 12a and the back surface 12b were both subjected to knurling. Both the knurl finishes 21 on the front and back surfaces 12a and 12b were arranged orthogonally to each other (to form a grid) as viewed from the front surface 12a. The pitches p1 and p2 in these cases were the same, 100 μm. The test was made by changing the depths d1 and d2 of the knurl finishes 21 on the front and back surfaces 12a and 12b. Specifically, the depths d1 and d2 in Case 5 were both 80 μm, the depths d1 and d2 in Case 6 were both 110 μm, and the depths d1 and d2 in Case 7 were both 140 μm. The test results show that when the depth was 80 μm or more, which is deeper than in Case 4, the illuminance was considerably reduced, which provides no practical function as a fill light in taking photos with a camera. The appearance, however, is good because of high invisibility of the light source 13.

FIG. 14 shows the results of still other illumination test cases where the front surface 12a and the back surface 12b were both subjected to knurling and both the knurl finishes 21 on the front and back surfaces 12a and 12b were arranged orthogonally to each other (to form a grid) as viewed from the front surface 12a. The pitches p1 and p2 in these cases were the same, 100 μm. The depths d2 of the knurl finishes 21 on the back surfaces 12b in these cases were also the same, 20 μm. The test was made by changing the depth d1 of the knurl finish 21 on the front surface 12a. Specifically, the depth d1 in Case 8 was 80 μm, the depth d1 in Case 9 was 110 μm, and the depth d1 in Case 10 was 140 μm. The test results show that the depth d1 of the knurl finish 21 on the front surface 12a did not so much effect on the illuminance as the depth d2 of the knurl finish 21 on the back surface 12b and the illuminance could be maintained to some extent even at d1=80 μm. Furthermore, as the depth d1 increased from 80 to 110 μm and from 110 to 140 μm, the relative illuminance reduced.

FIG. 15 shows the results in still other illumination test cases where the front surface 12a and the back surface 12b were both subjected to knurling and both the knurl finishes 21 on the front and back surfaces 12a and 12b were arranged orthogonally to each other (to form a grid) as viewed from the front surface 12a. The depths d1 and d2 in these cases were the same, 50 μm. The pitch p1 of the knurl finish 21 on the front surface 12a in Case 11 (corresponding to the second embodiment) was 400 μm, the pitch p1 in Case 12 was 200 μm, and the pitches p2 of the knurl finishes 21 on the back surfaces 12b in these cases were the same, 100 μm. The relative illuminance in each case was high to sufficiently serve as a fill light in taking photos with a camera. Particularly in Case 11, light was evenly diffused and the light source 13 was hard to see through the light-source cover 12 and thereby provided a good appearance.

FIG. 16 shows the results in still other illumination test cases where the front surface 12a and the back surface 12b were subjected to knurling and spin finishing, respectively. The depths d1 of the knurl finishes 21 in these cases were the same, 50 μm, the depths d2 of the spin finishes 22 in these cases were the same, 50 μm, but the pitches p1 and p2 were changed. Specifically, the pitches p1 of the knurl finishes 21 on the front surfaces 12a in Cases 14 and 15 were 200 μm, the pitches p1 in Cases 13 and 16 were 400 μm, the pitches p2 of the spin finishes 22 on the back surfaces 12b in Cases 14 and 16 were 100 μm, and the pitches p2 in Cases 13 and 15 were 200 μm. In view of illuminance distribution, Cases 13 and 16 are preferable because light is radially diffused. Case 16 (corresponding to the first embodiment) is more preferable because it can obscure the internal light source 13 well. Case 16 radially diffused incident light as diamond does, which looks very different from the other cases.

OTHER EMBODIMENTS

The above embodiments of the present invention may be modified as follows.

Although in the above embodiments the portable device is a mobile phone 1, it may be any portable device having a function of taking photos. Portable devices having a function of taking photos include personal computers, mobile tools, personal handyphone systems (PHSs) and personal digital assistants (PDAs). Portable devices of the present invention also include portable digital cameras and analog cameras.

The embodiments described above are merely illustrative in nature and are not intended to limit the scope, applications and use of the invention.

What is claimed is:

1. A light-source cover for controlling transmission of light from a light source mounted in a portable device, the light-source cover being made of a single-piece material and having a knurl finish composed of linear grooves on at least one of a front surface and a back surface, wherein
    the knurl finish has a saw-toothed cross section,
    each saw tooth of the saw-toothed cross section includes an inclined part extending outwardly from a side close to a central axis of the light source to gradually increase the tooth height and an orthogonal part continued from the inclined part to fall therefrom orthogonally to a finished surface, and
    all of the linear grooves extending in a direction parallel to one another.

2. The light-source cover of claim 1, wherein the single piece material is a molded article made of acrylic resin or polycarbonate resin.

3. The light-source cover of claim 1, wherein each of the knurl finish has a depth of 50±10 μm.

4. The light-source cover of claim 1, wherein
    the knurl finish on the front surface has a pitch of 400±100 μm, and the knurl finish on the back surface has a pitch of 100±25 μm.

5. The light-source cover of claim 1, wherein the inclined part of the knurl finish on the front surface has a gradient of substantially tan ⅛, and the inclined part of the knurl finish on the back surface has a gradient of substantially tan ½.

6. The light-source cover of claim 1, wherein each of the knurl finish on the front surface, the knurl finish on the back surface is applied to form a depression towards the central axis of the light source.

7. The light-source cover of claim 1, wherein the knurl finishes on the front surface and the back surface are applied to be orthogonal to each other as viewed from the front surface.

8. A portable device, comprising:

the light-source cover of claim 1.

9. The portable device of claim 8, wherein the portable device includes a mobile phone.

10. The light-source cover of claim 1, wherein the front surface is flat.

11. The light-source cover of claim 1, wherein the back surface is provided with a spin finish composed of ripple grooves having a saw-toothed cross section.

12. The light-source cover of claim 1, wherein the linear grooves extend in a direction parallel to an upper edge of the light-source cover.

13. The light-source cover of claim 1, wherein the linear grooves extend in a direction parallel to a side edge of the light-source cover.

* * * * *